Dec. 20, 1949     P. E. ALLEN     2,491,791
PROTECTIVE CLOSURE FOR AUTOMOBILE GAS TANK FILLERS
Filed July 5, 1947
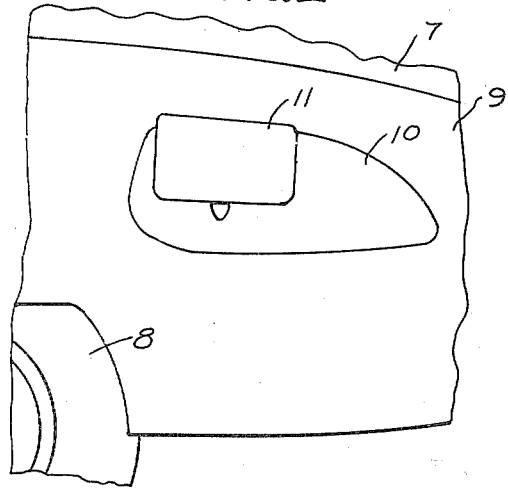
FIG. 1
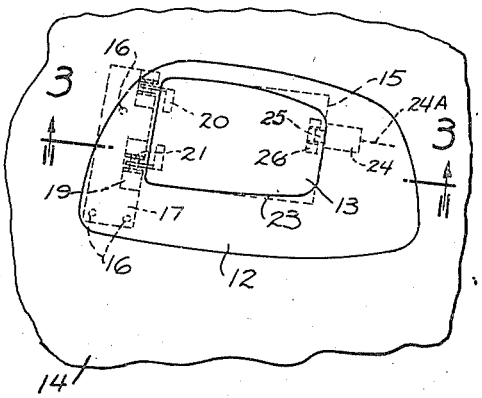
FIG. 2
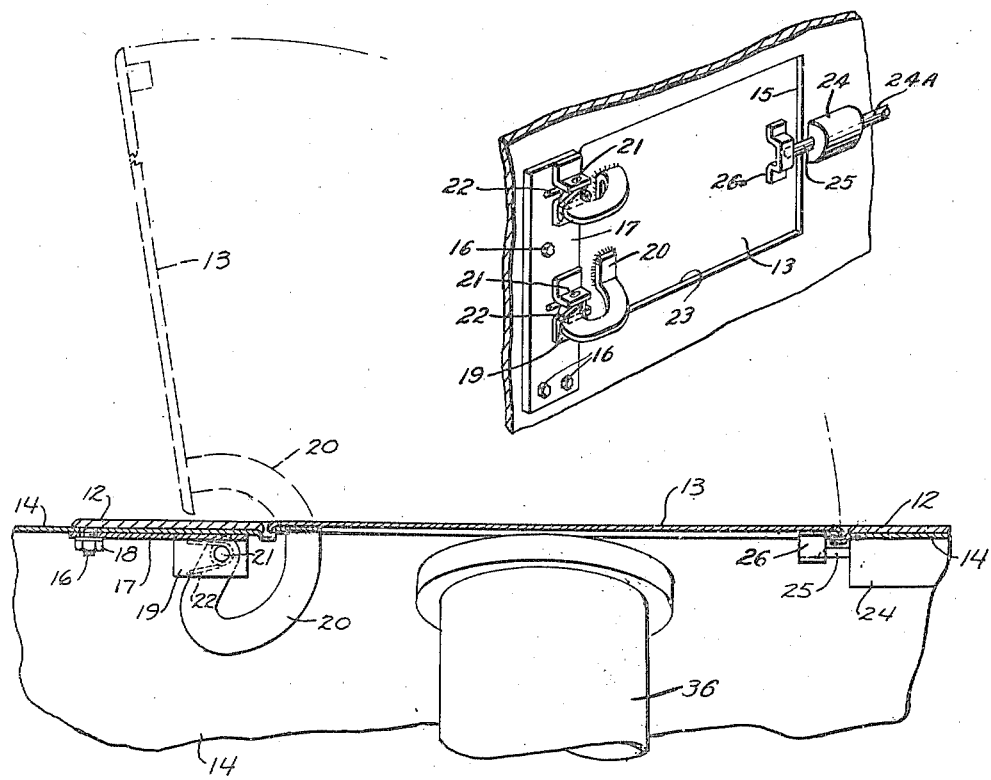
FIG. 4
FIG. 3
INVENTOR.
Perry E. Allen
BY
Edward M. Apple
ATTORNEY.

Patented Dec. 20, 1949

2,491,791

UNITED STATES PATENT OFFICE 2,491,791

PROTECTIVE CLOSURE FOR AUTOMOBILE GAS TANK FILLERS

Perry E. Allen, Pigeon, Mich.

Application July 5, 1947, Serial No. 759,140

2 Claims. (Cl. 280—153)

This invention relates to automotive vehicles, and has particular reference to a protective closure for the rear fender of an automobile adjacent the gas tank filler.

An object of the invention is to provide a combined protective shield and hinged cover for the opening in an automobile fender through which the gas tank may be filled.

In current models of conventional automobiles, it is customary to support the gas tank at the rear end of the vehicle body, and to provide an opening in one of the rear fenders through which the gas tank filler pipe is made accessible. Such a construction offers numerous difficulties for the owner of the automobile. Often times the rear fender adjacent the filler opening is damaged by the gas station attendant when he rests the gas pump nozzle on the finish of the fender. At other times the gasoline carried in the tank is siphoned out because the filler opening is readily accessible to a thief.

It is, therefore, an object of the invention to provide a combined protective shield and cover plate for the gas tank filler opening in the rear fender, which will obviate both of the difficulties indicated above.

The foregoing and other objects and advantages of the invention will become more apparent as the description proceeds, reference being made from time to time to the accompanying drawings, forming part of the within disclosure, in which drawings:

Fig. 1 is a fragmentary detail of the rear portion of an automobile body showing a device embodying the inventions mounted on the rear fender thereof.

Fig. 2 is an enlarged fragmentary detail of a rear fender of an automobile showing a modified form of the device illustrated in Fig. 1.

Fig. 3 is a section taken substantially on the line 3—3 of Fig. 2.

Referring now more particularly to the drawings, it will be understood that in the embodiment herein disclosed, the reference character 7 indicates the body of the automobile having rear wheel 8, and rear fender 9, on which is mounted the protective shield 10 to which is secured the closure flap 11, all of which will be described more in detail hereinafter.

In Fig. 1, I show one form of protective shield and cover flap, whereas in Fig. 2 I show a different form thereof. In Fig. 2 the protective shield 12 is of somewhat different shape than the protective shield 10 illustrated in Fig. 1, and in this modification the cover member 13 is of different shape and hinged at one end instead of along the side as intended in Fig. 1.

In Fig. 2 the fender 14 is provided with the conventional cut-out portion 15 through which the filler pipe 36 (Fig. 3) is made accessible. The conventional cover member for the cut-out portion is removed, and the cover member 13 is substituted therefore, so that the protective shield 12, and the cover member 13 together form an accessory which is installed on the fender 14, as hereinafter described. The protective shield 12 is preferably formed of a sheet of metal having threaded studs 16 formed thereon, which are adapted to extend through apertures formed in the fender 14. A second plate 17 is positioned on the underside of the fender 14, and is also provided with apertures through which are extended the threaded studs 16, which are adapted to accommodate the nuts 18 which lock the protective shield 12, and the under plate 17 in cooperative position on the fender 14.

Brackets 19 are secured by welding, or other suitable means, to the underside of the plate 17 and serve as supports for the arms 20 which are pivoted thereto, as at 21. Compression springs 22 cooperate with the arms 20 and the underside of the plate 17, to urge the arms 20 into the open position as shown by the dotted lines in Fig. 3.

The cover member 13 is supported on the end of the arms 20, and is intended to close the cut-out 23 formed in the protective shield member 12. The closure member 13 is normally held down by means of a lock 24 having a bolt 25 adapted to cooperate with a catch 26 carried on the underside of the closure 13. The lock 24 is of a conventional type such as a solenoid operated bolt which may be operated electrically or a cable controlled slide bolt operable manually from the interior of the automobile by means indicated at 24A.

Having described my invention, what I claim and desire to secure by Letters Patent is:

1. In a device of the character described, the combination with an automobile fender having an opening therein, of a protective cover plate, having an area greater than said opening and having a peripheral contour different from the contour of said opening and having a cutout portion in alignment with the opening in said fender, and arranged on the top of said fender, a second plate positioned below said fender and having fastening means for attaching to said first plate like member, brackets secured to said second plate, arms pivoted to said brackets, and a closure member secured to said arms, said closure member being adapted to close the cut-out portion in said protective cover plate.

2. An article of manufacture for use in combination with an automobile fender having a cut-out portion, comprising a protective plate adapted to be positioned on the outside of said fender and having an area substantially larger than said cut-out, said plate having a cut-out portion arranged for alignment with the cut-out portion of said fender, means including a second plate secured to said first plate for supporting pivoted arms, and a closure member secured to said pivoted arms and arranged to close the cut-out portion in said plate.

PERRY E. ALLEN.

REFERENCES CITED

The following references are of record in the file of this patent:

UNITED STATES PATENTS

| Number | Name | Date |
| --- | --- | --- |
| 1,480,274 | La Barre | Jan. 8, 1924 |
| 2,035,895 | Kelly | Mar. 31, 1936 |
| 2,151,249 | Vidmar | Mar. 21, 1939 |
| 2,197,328 | Wilson | Apr. 16, 1940 |
| 2,258,812 | Ross | Oct. 14, 1941 |
| 2,282,443 | Wilson | May 12, 1942 |
| 2,417,324 | Rivard et al. | Mar. 11, 1947 |